(No Model.)  
5 Sheets—Sheet 2.
S. F. TIBBETTS.
WOOD WORKING MACHINE.
No. 455,538. Patented July 7, 1891.
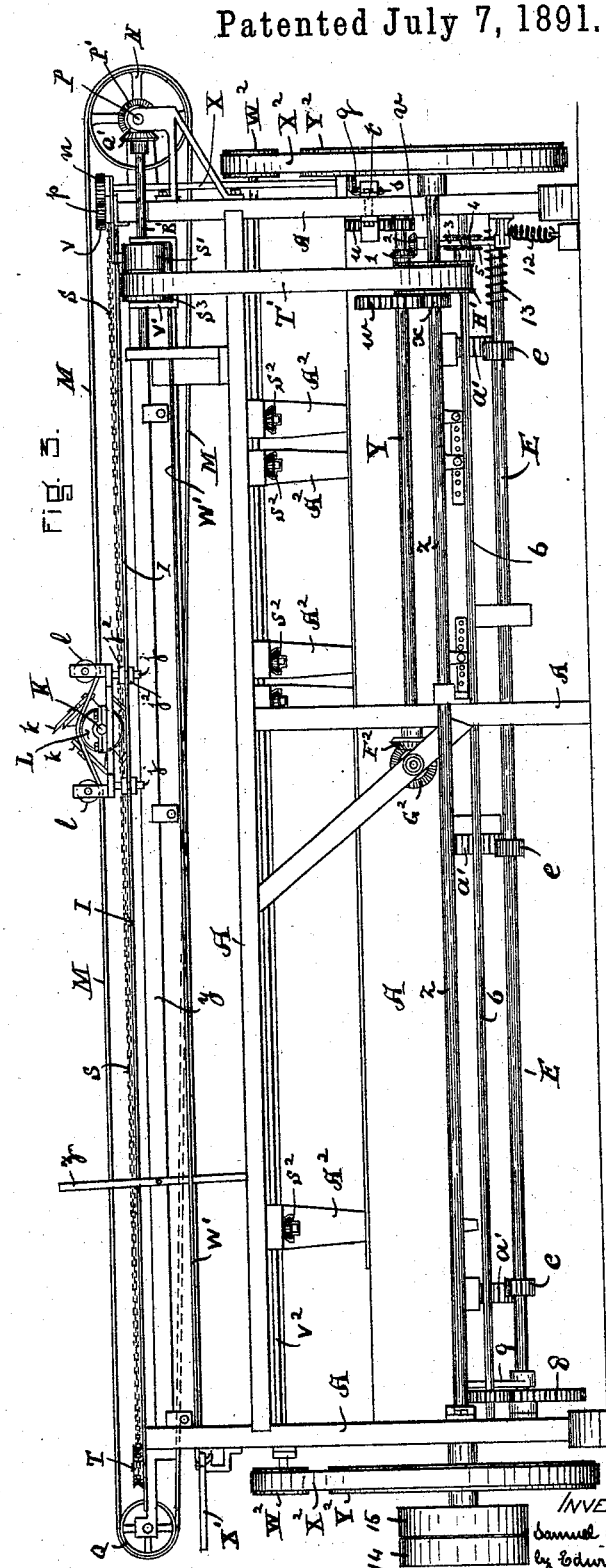
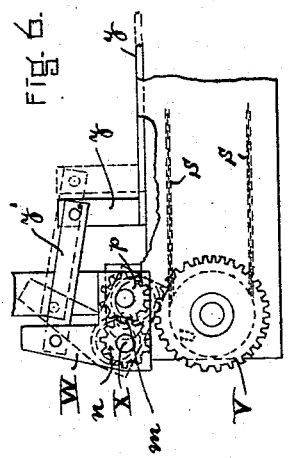
WITNESSES.  
Winifred G. Kerwin  
William H. Ross
INVENTOR.  
Samuel F. Tibbetts  
by Edwin Plante  
attorney (No Model.) 5 Sheets—Sheet 3.
S. F. TIBBETTS.
WOOD WORKING MACHINE.
No. 455,538. Patented July 7, 1891.
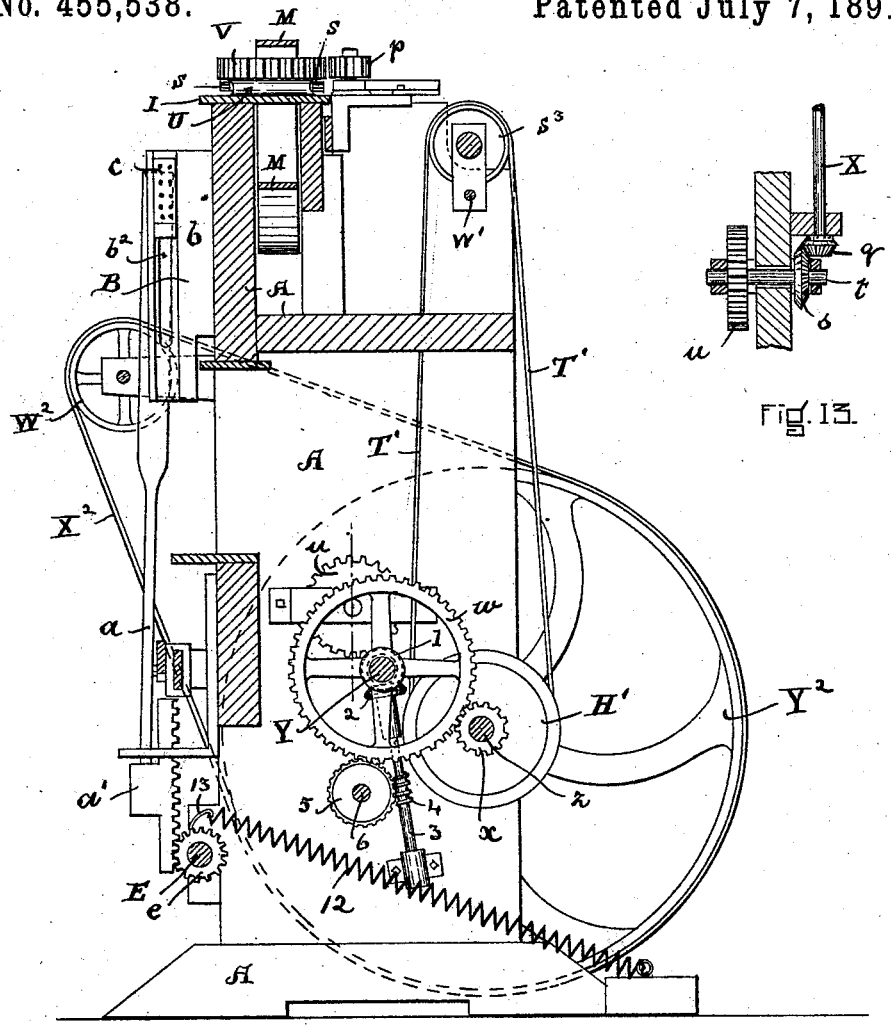
Fig. 13.
Fig. 4.
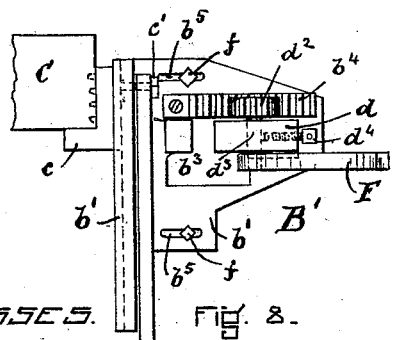
Fig. 8.
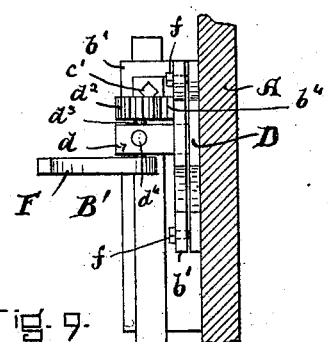
Fig. 9.
WITNESSES.
Winifred G. Kerwin
William H. Ross
INVENTOR
Samuel F. Tibbetts
by Edwin Planta
attorney (No Model.) 5 Sheets—Sheet 4.

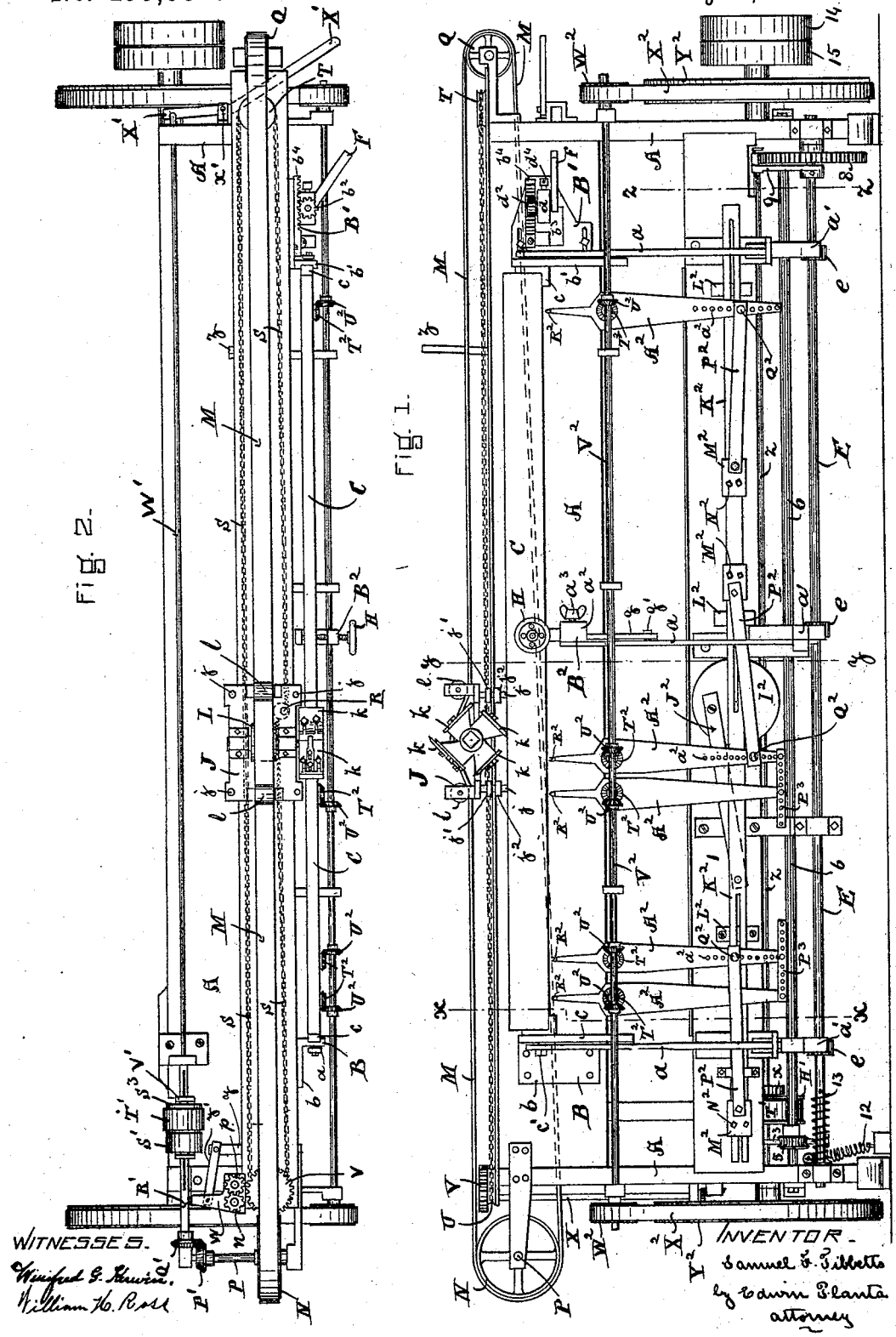

S. F. TIBBETTS.
WOOD WORKING MACHINE.

No. 455,538. Patented July 7, 1891.

WITNESSES.
Winifred G. Kerwin
William H. Ross

INVENTOR.
Samuel F. Tibbetts
by Edwin Planta
attorney (No Model.)  5 Sheets—Sheet 5.

S. F. TIBBETTS.
WOOD WORKING MACHINE.

No. 455,538. Patented July 7, 1891.

WITNESSES.  INVENTOR.

UNITED STATES PATENT OFFICE.

SAMUEL F. TIBBETTS, OF BIDDEFORD, MAINE.

WOOD-WORKING MACHINE.

SPECIFICATION forming part of Letters Patent No. 455,538, dated July 7, 1891.

Application filed June 21, 1890. Serial No. 356,195. (No model.)

*To all whom it may concern:*

Be it known that I, SAMUEL F. TIBBETTS, a citizen of the United States, residing at Biddeford, in the county of York and State of Maine, have invented certain new and useful Improvements in Wood-Working Machines, of which the following, taken in connection with the accompanying drawings, is a specification.

My invention relates to improvements in wood-working machines in which the several functions of jointing, grooving, and mortising are performed in one and the same machine; and the invention has particular reference to certain improvements in a wood-working machine for which Letters Patent were granted to me the 21st day of August, 1888, No. 388,320, as hereinafter fully described, and pointed out in the claims.

Figure 5:
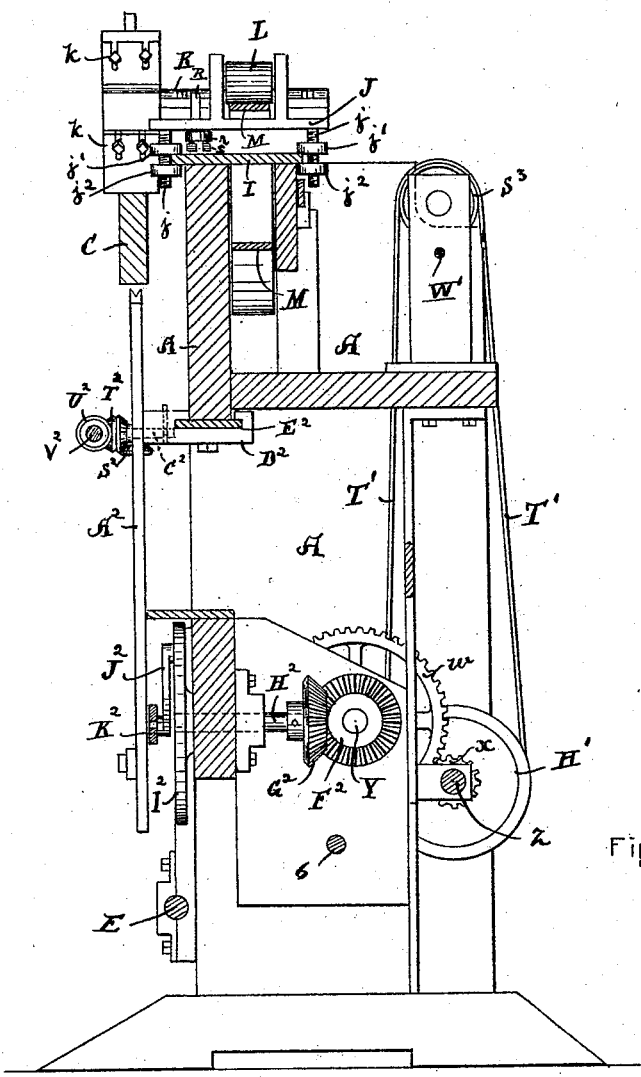
Figure 7:
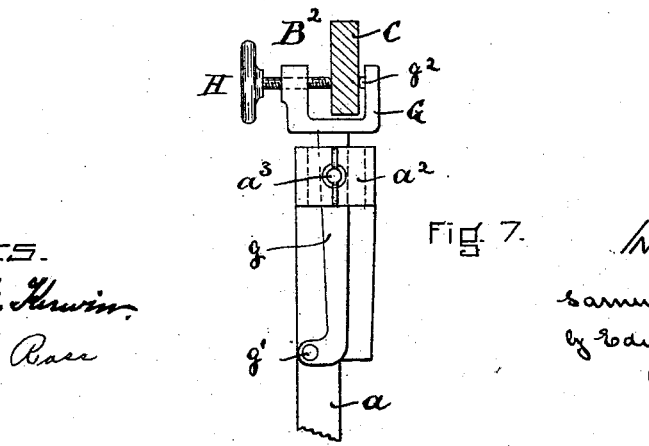
Figure 10:
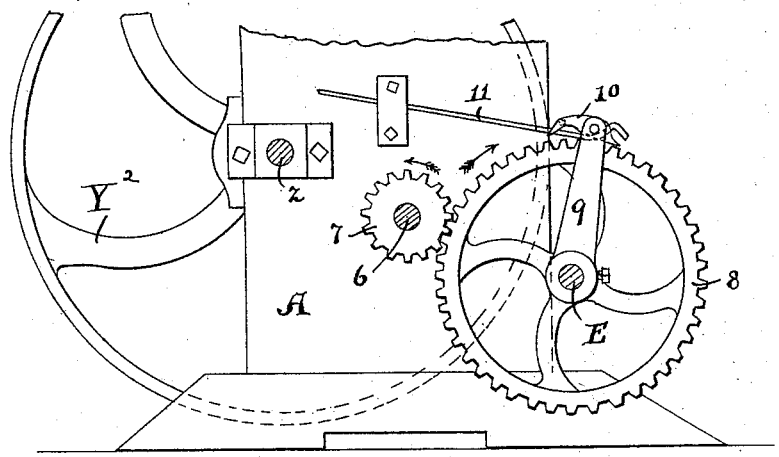
Figures 11, 12:
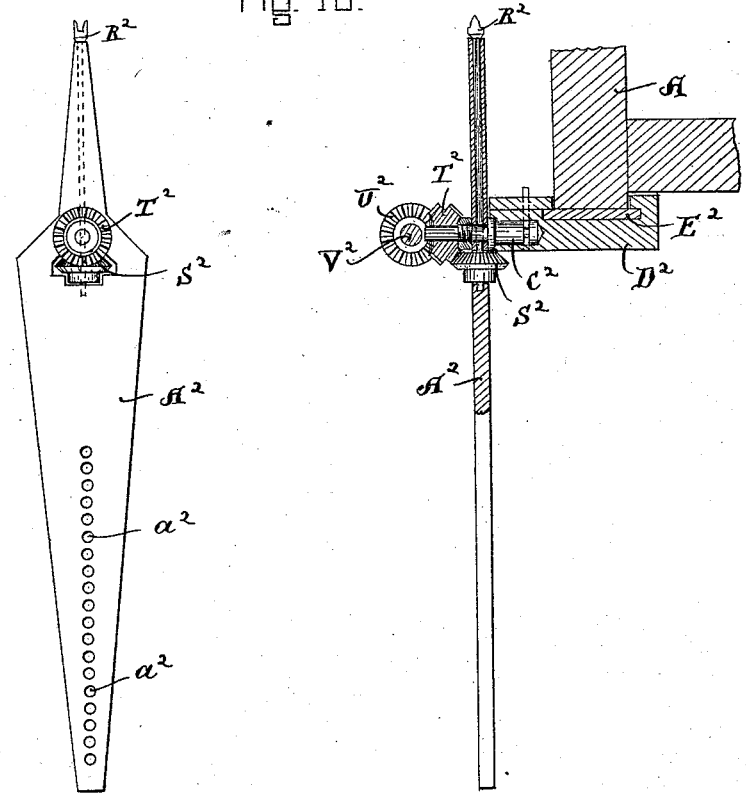

Referring to the accompanying drawings, Figure 1 represents a front elevation of a machine embodying my invention. Fig. 2 is a plan or top view, and Fig. 3 is a rear elevation of the same. Fig. 4 is a vertical transverse section on line $x$ $x$ of Fig. 1. Fig. 5 is a similar section taken on line $y$ $y$ of Fig. 1. Fig. 6 is a plan or top view of the mechanism for operating the traveling carriage. Fig. 7 is a side elevation of the central clamping device. Figs. 8 and 9 are respectively front view and end view of the end clamping device. Fig. 10 is a vertical transverse section taken on line $z$ $z$ of Fig. 1, showing the means for transmitting motion to the clamps for lowering the material being operated upon. Fig. 11 is a front view of one of the tool-holders, and Fig. 12 is a vertical section through the same, showing how it is supported on the frame. Fig. 13 is a detail view.

A represents a frame of wood or other suitable material. Upon the front of this frame are secured clamps B B' for supporting the material C to be operated upon and a central clamp $B^2$ for retaining the material in position. The end B of the clamp consists of an angle-iron plate $b$, secured to the front of the machine, and a sliding angle-iron plate $c$ for receiving the end of the material to be operated upon. The plate $c$ is connected to a pitman $a$ by a bolt $c'$, that passes through a slot $b^2$ (see Fig. 4) in the outwardly-projecting portion of the angle-iron plate $b$. The end of the pitman is provided with a rack $a'$, that is in gear with a pinion $e$ on shaft E, to which motion is imparted, as hereinafter described. The end B' consists of a flat plate D, secured to the front of the machine and provided with a boss or stud $d$, (see Figs. 1, 8, and 9,) and an angle-iron plate $b'$, provided with a slot or opening $b^3$, through which the boss $d$ passes. On the face of the plate $b'$ is secured a rack $b^4$, that is in gear with a pinion $d^2$, carried by a short shaft $d^3$, that passes through the stud $d$, on the lower end of which is secured a lever F, so that by the movement of the lever F the plate $b'$ can be thrown forward or drawn back, as required. Slots $b^5$ $b^5$ are formed in the plate $b'$, through which bolts $f$ pass into the plate D. These bolts are for retaining the plate $b'$ when in the desired position, and the shaft $d^3$ is held by a set-screw $d^4$. The projecting portion of the plate $b'$ is provided with a slot, through which a bolt $c'$ passes to secure the angle-iron $c$ to a pitman $a$, as described with reference to the end B. Teeth are provided on the plate $c$, which enter the material and securely hold the same between the clamps.

The central clamp $B^2$ consists of a U-shaped piece of metal G on the end of a bar $g$, which is fulcrumed at $g'$ to a pitman $a$, the upper end of the pitman being provided with a slotted boss $a^2$, through which a thumb-screw $a^3$ passes to hold the bar $g$ in the required position. The material C is held between a stud $g^2$ and a set-screw H, as shown.

On the top of the frame A is secured a plate I, upon which is mounted a sliding carriage J. This carriage is supported by four screw-threaded studs or bolts $j$ and nuts $j'$ $j^2$. The studs pass down on the outside of the plate I. (See Fig. 5.) The nuts $j'$ are above and the nuts $j^2$ are below the plate I, as shown. By this means the carriage can be readily raised from or lowered toward the plate I, as required.

The carriage J is provided with a spindle K, that carries the cutting-tools $k$ (see Figs. 1 and 5) for jointing and grooving the material. Upon the spindle is also mounted a pulley L, and on each side of the pulley L is mounted a roller $l$.

M is a belt that passes around a pulley N on a shaft P at one end of the machine and around a loose pulley Q, mounted at the other end of the machine, the belt passing under the two rollers $l\,l$ and over the pulley L. On the end of the shaft P is mounted a bevel-wheel P', in gear with a bevel-wheel Q' on a short shaft R', upon which is mounted fast and loose pulleys S' S³, that are driven by a belt T' from a pulley H' on the main shaft Z.

V' is a shipper for shifting the belt T' from one pulley to the other. This shipper is by a rod W' connected to one end of a lever X', fulcrumed to the frame at $x'$, the handle portion standing out in front at the end of the machine, as shown. (See Fig. 2.) A short spindle R passes through the carriage J, and to its lower end is secured an eccentric disk $r$, to which the two ends of a chain S are secured. This chain passes around sprocket-wheel T, loosely mounted at one end of the machine, and at the other end of the machine around a sprocket-wheel U; which is mounted upon a short shaft carrying a cog-wheel V, to which rotary motion is imparted in one direction or the other in the following manner: W is a plate of metal of L form, fulcrumed to the frame A at $m$. (See Figs. 2 and 6.) X is a vertical shaft, which passes through the plate W and at its upper end is fitted with a pinion $n$, that is in gear with a pinion $p$, mounted upon a stud in the plate W. The lower end of the vertical shaft X is provided with a bevel-wheel $q$, (see Fig. 13,) that is in gear with another bevel-wheel $s$, mounted on the end of a short shaft $t$, upon which is also mounted a cog-wheel $u$, in gear with a pinion $v$ on shaft Y, upon which is also mounted a cog-wheel $w$, (see Fig. 3,) in gear with a pinion $x$ on the main driving-shaft Z. One or the other of the pinions $n$ $p$ are thrown into gear with the cog-wheel V by means of a sliding bar $y$, connected by a bar $y'$ to the outer arm of the plate W, the bar $y$ being operated by a lever $z$, fulcrumed at its lower end to the frame of the machine. If the lever $z$ is left in the vertical position, as shown, neither of the pinions $n$ $p$ will be in gear with the cog-wheel V, (see Fig. 6,) in which case the carriage J will remain stationary.

The material is mortised in the following manner: A² A² are tool-holders, (see Figs. 1, 11, and 12,) each supported in front of the machine by a stud C², secured in a block or slide D², that is free to be pushed backward or forward on a plate E², secured to the frame A.

A horizontal oscillating motion is imparted to the tool-holder from the shaft Y as follows: On the end of the shaft Y is secured a bevel-wheel F², (see Fig. 5,) that is in gear with a bevel-wheel G² on a short shaft H², that passes to the front of the machine, and upon which is mounted a disk I², to which is connected one end of a pitman J², (see Figs. 1 and 5,) the other end of which is secured to a horizontal bar K², supported by suitable brackets L², upon which the bar is free to slide, and upon the bar K² sliding blocks M² are mounted, which are held in the desired position by set-screws N². To each of these blocks M² is secured one end of a lever P², the other end being secured to the lower end of the tool-holders A² by means of a screw or bolt Q², passing into or through one of the series of holes $a^2$ in the tool-holder, so that the levers P² can be readily adjusted up or down on the tool-holder to regulate the amount of throw to be given to the same, according to the length of mortise required to be cut. When the mortises are to be very long or two mortises to be cut close together, the tool-holders are then arranged in pairs and motion is communicated from the bar P² to one of the tool-holders and transmitted to the other by means of a short bar P³, bolted to the lower ends of the tool-holders, a series of holes being provided in each bar P², so that the space between the tool-holders can be adjusted as required. The spindle of the cutting-tool R² (see Fig. 12) passes down through the upper end of the tool-carrier A², and to its lower end is secured a bevel-wheel S², which is in gear with one side of a double bevel-gear T², mounted upon the outer end of the spindle C². Each of these double bevel-gear T² is in gear with a bevel-wheel U², mounted upon a shaft V², carried by suitable bearings, and upon each end of said shaft is mounted a pulley W², that is driven by a belt X² from a large pulley Y² on the main shaft Z, so that as the main shaft revolves a quick rotary motion is imparted to the cutters.

As the material C is being mortised it has to be lowered slowly down onto the rotating cutters. This I accomplish as follows: On the main shaft Z is mounted a pinion $x$, (see Fig. 4,) that is in gear with a cog-wheel $w$ on shaft Y. Upon this shaft is also mounted a bevel-gear 1, in gear with a bevel-wheel 2 on a short vertical shaft 3, which is provided with a worm 4, that is in gear with a worm-wheel 5, mounted on a shaft 6, that extends the whole length of the machine, and upon the other end of which is mounted a pinion 7, (see Fig. 10,) in gear with a toothed wheel 8, loosely mounted upon the shaft E, and on which by the side of the loose wheel is secured an arm 9, carrying at its outer end a pawl 10, which when thrown into contact with the teeth of the wheel 8 will cause the shaft E to be rotated, so that the pinions $e$ will draw down the racks $a'$, and with them the pitmen $a$ and clamps B B' B², thereby lowering the material onto the rotary cutters. After the material has been lowered sufficiently, the wheel 8 having made about three-fourths of a revolution, the tail of the pawl 10 comes into contact with the shaft 6 and raises it out of contact with the wheel 8, and it is held out of contact by a spring 11, and as soon as the wheel 8 is released the shaft E is caused to rotate in the opposite direction by means of a spiral spring 12, (see Figs. 1 and 4,) drawing upon a spring 13, wound around the end of the shaft E, as shown, so that as the shaft E is rotated by the springs 12 and 13 the racks $a'$, pitman $a$, and clamp are raised to their normal position.

The machine is driven from any convenient source by a belt passing around fast and loose pulleys 14 15 on the main shaft Z.

The operation is as follows: The carriage J being at one end or other of the machine, the piece of material to be operated upon is taken in the rough—that is, as it comes from the saw-mill—and placed between the clamps B B' B². The machine is then started and the lever X' moved so as to throw the belt T' onto the fast pulley S', which transmits rotary motion to the cutters $k$, as before described. The lever $z$ is then moved so as to throw one or the other of the pinions $n$ $p$ into gear with the cog-wheel V, and thereby cause the carriage to travel from one end of the machine to the other. When the jointing and grooving is completed, the lever $z$ is moved so as to throw both pinions $n$ $p$ out of gear with the cog-wheel V, thereby stopping the carriage. A horizontal oscillating motion is imparted to the tool-carriers A², while at the same time a rotary motion is imparted to the cutters R² in the manner before described. The operator then throws the pawl 10 into contact with the wheel 8, which causes the shaft E to be rotated, which, through pinions $e$, racks $a'$, and pitmen $a$, brings the material down very slowly, and the cutters R² enter and pass through the material. When the pawl 10 is thrown out of contact with the wheel 8, the springs 12 13 cause the shaft E to rotate in the reverse direction, thereby raising the clamps to their normal position, when the machine is stopped. The material is then taken out and another piece inserted, when the operation is repeated.

Although I have described the machine as first jointing and grooving the material and then mortising the same, it is obvious that the operation might be reversed.

What I claim as my invention is—

1. The oscillating tool-holders A², carrying rotary cutters R², in combination with the shaft V², extending across the front of the machine, and bevel-gears U² mounted thereon, the double-faced bevel-gears T², mounted loosely upon the studs C², and the bevel-gears S² on the spindles carrying the rotary cutters, substantially as set forth.

2. The oscillating tool-holders A², mounted upon studs C², carried by blocks or slides D², adjustable upon a plate E², secured to the frame A, and the double-faced gears T², mounted loosely upon the studs C², the inner face of which is in gear with the bevel-wheels S² on the spindles of the rotary cutters R² and the outer face in gear with bevel-gears U², mounted upon a shaft extending across the front of the machine, substantially as shown and described.

3. The tool-holders mounted in front of the machine and having an oscillating motion imparted to them, in combination with rotary cutters operated by bevel-wheels on a shaft in front of the tool-holders, each of said wheels being in gear with a double-faced bevel-wheel loosely mounted upon the stud carrying the tool-holder and the inner face of said wheel being in gear with a bevel-wheel on the cutter-spindle, the inner face of the double bevel-wheel being free to swing a short distance round the bevel-wheel on the cutter-spindle when the machine is in motion, thus allowing the tool-holder to oscillate, as set forth.

4. In combination, the main shaft Z, pinion $x$, mounted thereon and in gear with a cog-wheel $w$ on shaft Y, bevel-gear I in gear with bevel-wheel 2 on vertical shaft 3, having a worm 4 in gear with worm-wheel 5 on one end of shaft 6 and on the other end of said shaft a pinion 7 in gear with a toothed wheel 8, loosely mounted upon shaft E, arm 9, secured to said shaft, having at its outer end a pawl 10, pinions $e$, racks $a'$, and pitmen $a$ for lowering the material onto the cutters, substantially as shown and described.

5. The clamping device consisting of the slotted angle-plate $b$ and angle-iron $c$ at one end and at the other a flat plate D, having a boss $d$, slotted angle-plate $b'$, rack $b^4$, pinion $d^2$, lever F, and sliding angle-plate $c$, the plates $c$ being connected to pitmen $a$ by bolts $c'$ and operated substantially as described.

6. The central clamp B², consisting of the jaws G, having stud $g^2$ and set-screw H, the bar $g$, fulcrumed at $g'$, in combination with the pitman $a$, having a slotted boss $a^2$ and set-screw $a^3$, substantially as shown and described.

7. The L-shaped plate W, fulcrumed at $m$ to the frame A, the vertical shaft X, driven through suitable gears from the main shaft $z$, a pinion $n$, mounted upon the upper end of said shaft X and in gear with a pinion $p$, mounted upon a stud on the plate W, in combination with the sliding bar $y$ and connecting-bar $y'$, whereby either of the pinions $n$ $p$ can be thrown into gear with the gear-wheel V for imparting motion to the sprocket-wheel U and chain S, whereby they are moved in the direction required, substantially as shown and described.

8. In combination with the plate I, the carriage J, supported thereon by screw-threaded studs $j$, passing outside the plate, and nuts $j'$ $j^2$, one of said nuts being above the plate I and the other below it, so that the carriage can be adjusted as required and be free to move from end to end of the plate while its height from said plate can be readily adjusted, the chain S, connected at each end to the carriage, said chain passing over sprocket-wheels T U, and cog-wheel V, to which motion is imparted from the main shaft, substantially as shown and described.

In testimony whereof I have signed my name to this specification, in the presence of two subscribing witnesses, on this 26th day of May, A. D. 1890.

SAMUEL F. TIBBETTS.

Witnesses:
 L. W. HOWES,
 EDWIN PLANTA.